Jan. 14, 1969
B. FORD ETAL
3,421,184
CLAMPS FOR MOLDS
Filed Sept. 21, 1966
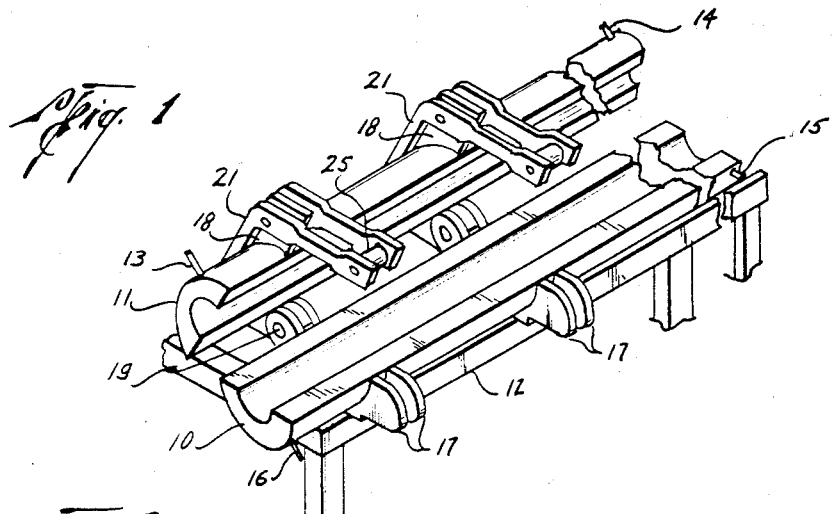
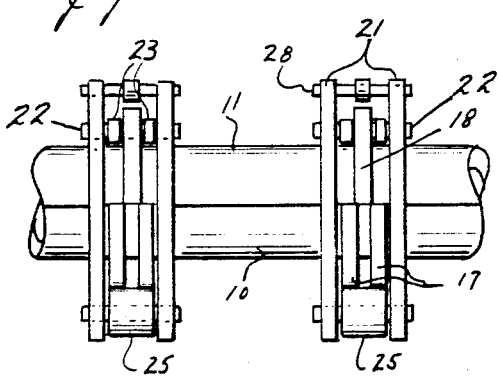
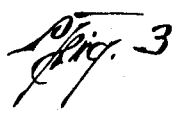
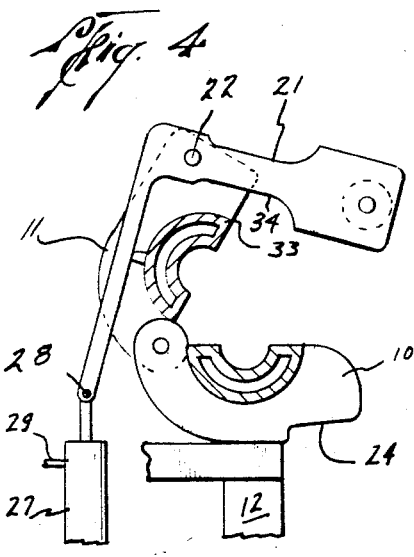
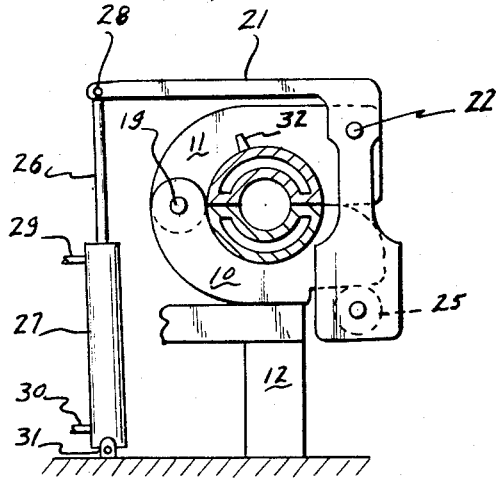
Bruce Ford
Stanley A. Swisher
INVENTORS
BY
ATTORNEYS United States Patent Office 3,421,184
Patented Jan. 14, 1969

3,421,184
CLAMPS FOR MOLDS
Bruce Ford and Stanley A. Swisher, Sand Springs, Okla., assignors to The Youngstown Sheet and Tube Company, Boardman, Ohio, a corporation of Ohio
Filed Sept. 21, 1966, Ser. No. 581,041
U.S. Cl. 18—43　　　5 Claims
Int. Cl. B29c 1/16; B29h 5/22; B41b 11/54

This invention relates to molds, and more particularly to split pipe molds for molding pipe such as Fiberglas reinforced resin preforms under pressure.

Plastic pipe may be fabricated from strips of paper supporting longitudinal strands of Fiberglas in a matrix of partially cured resin.

The strips are wound about a mandrel, preferably in spiral layers with each layer wound in opposite direction to its neighbor.

The preform thus provided is cured under elevated temperature to provide a plastic pipe.

Preferably the mandrel is removed, the preform placed within a mold and expanded under pressure and heat. In the past, this has been accomplished in a one-piece mold with the preform inserted and removed through one end of the mold. For a detailed description of the above method of manufacturing plastic pipe, see Patent No. 3,256,128, Richardson et al.

While the one-piece pipe mold will produce pipe in the manner taught in the above patent, certain disadvantages are present. For instance, it is difficult to remove the finished pipe from the mold, clean the mold and refinish any areas which are damaged.

While split molds are well known, they are rather elaborate and their latching mechanisms are hand-operated. See U.S. Patent No. 2,587,061. Mechanically-operated molds are extermely complex and would be even more complex if applied to a pipe mold. See Bostwick No. 2,224,336.

It is an object of this invention to provide a latch mechanism which makes it practical to employ a split mold in curing plastic pipe under pressure.

Another object is to provide a power-operated latch, open and close mechanism for a split pipe mold which latches the mold at multiple points along its length.

Another object is to provide a power-operated latch mechanism as in the preceding object in which substantially all of the reacting forces holding the mold closed against internal pressure are provided by mechanical linkages and not the power-operated mechanism.

Another object is to proivde an operating mechanism which by straight-line movement of rods effects opening, closing, latching and unlatching of a split mold at multiple points along the length of the mold.

Another object is to provide a latch mechanism as in the preceding object in which operation of a plurality of pistons attached to the rods efforts simultaneous operation of the several latch, open and close mechanisms.

Other objects, features and advantages of this invention will be apparent from the drawing, the specification and the claims.

In the drawing, wherein an illustrative embodiment of this invention is shown, and wherein like numerals indicate like parts:

FIGURE 1 is a isometric view of a pipe mold constructed in accordance with this invention showing two of the many latch mechanisms which are spaced along the mold;

FIGURE 2 is a side view of the pipe mold taken from the right-hand side of FIGURE 1;

FIGURE 3 is a view in cross-section through the pipe mold illustrating the mold in cross-section and the latch mechanism in elevation; and FIGURE 4 is a view similar to FIGURE 3 showing the mold in open position.

The tubular pipe mold illustrated is provided by a stationary mold half 10 and a movable mold half 11. Thus the mold is split longitudinally into two halves. The mold is supported on a suitable base 12. Heat for curing may be supplied to the mold halves in any suitable way, such as circulating steam through the mold halves via conduits 13, 14, 15 and 16.

A suitable means is provided for hinging the two mold halves together so that the movable mold half 11 may open and close as illustrated in FIGURES 3 and 4. Preferably a plurality of stationary hinge leaves 17 are attached, as by welding, to the stationary mold 10. These leaves extend perpendicular to the longitudinal centerline of the mold to points on opposite sides of the mold. In like manner, a plurality of movable hinge leaves 18 are attached to the movable mold half and extend parallel to the hinge leaves 17. The leaves 18 also extend to opposite sides of the mold. The statioinary and movable hinge leaves 17 and 18 are pinned together by hinge pins 19, which extend through the hinge leaves on one side of the mold.

A plurality of latch arms 21 are provided for opening and closing the movable mold half 11 and for latching the mold halves in closed position. Preferably, these latch arms are L shaped in configuration. The latch arms 21 are pivoted to the movable mold half 11, preferably at about the midpoint of the latch arms 21 and preferably to movable hinge leaves 18 on the other side of the mold from the hinge pins 19. The arms may be pivoted to the hinge leaves 18 by the pins 22. As illustrated, double stationary hinge leaves 17 are preferred and the arms 21 are also double arm structures. To center the double arm structures on the single movable hinge leaves 18, spacers 23 are provided about the pin 22 and between the movable hinge leaf 18 and the double arms of the arm 21.

Cooperable cam means are provided on one end of each arm and the stationary mold half. The cam means includes a cam surface which extends substantially perpendicular to a line through the pivot pins 22 and the cam means when the cam means is engaged. Preferably, the cam surface is provided by surface 24 on the stationary hinge leaf. The cam means on the arms 21 is preferably provided by a roller 25 which engages the surface 24 when the cam means is engaged. Referring to FIGURE 3, it will be noted that a line extending through the pivot means 22 and the cam means provided by the roller 25 and surface 24 will be substantially vertical. The preform within the mold is expanded by a bladder device. Thus, a substantial internal pressure is exerted tending to open the mold. The reactant forces holding the mold engaged are provided by the mechanical linkage of the arm 21 and the associated cam structure, pivot pin 22, and the leaves 17 and 18. Thus, the tendency of the mold to open under pressure is opposed by a simple mechanical linkage and the only external force needed is sufficient force to hold the cam means in engagement.

In accordance with this invention, means are provided for simultaneously rocking each of the arms 21 about pivot 22. Preferably this means is a simple pneumatic piston (not shown) attached to rod 26 and operating within cylinder 27. The rod 26 is pivoted to the arm 22 at 28 on the hinge side of the mold. The rod 26 may be reciprocated by pneumatic pressure supplied to the cylinder through conduits 29 and 30. The cylinder 27 is pivoted at 31 to a suitable foundation.

In order to provide for opening and closing of the movable mold half 11 upon rotation of the arm 21 about its pivot when the cam means is disengaged, a means is provided which engages the latch arm and prevents its further rotation about the pivot 22 when the cam means is disengaged. This means may be provided by a lug 32 welded to the movable mold half 11 and the movable leaves 18 in a position to be engaged by the arm 21 when it is rocked counterclockwise as viewed in the drawing. Thus, initial downward movement of shaft 26 will disengage the roller 25 from the surface 24 to release the cam means. Further downward movement of arm 26 will cause the arm 21 to engage lug 32 and thereafter to open the movable mold half 11 from the position shown in FIGURE 3 to the position shown in FIGURE 4. Upon upward movement of the rod 26 with the components in the position shown in FIGURE 4, the movable mold 11 will first close. Continued upward movement of rod 26 will engage the roller 25 with surface 24 to latch the mold in closed position.

In the event the movable mold is to be moved to a fully open position in which the pivot pin 22 moves across to the left-hand side of hinge pin 19 as viewed in FIGURE 4, then suitable means is provided for engaging the arm 21 so that upward movement of the shaft 26 will move the movable mold half 11 back past the center position. This structure may be provided by the surface 32 on the arm 21 engaging the exterior surface 33 of the movable mold half 11 so that the initial upward movement of the shaft 26 will rotate the movable mold half toward closed position due to engagement of surfaces 32 and 33.

While the L shaped arm shown is preferred, it will be apparent that other forms may be utilized. While it is preferred to provide a mechanical linkage which resists opening of the mold, this resistance could be provided by the fluid within the cylinder 27.

The rather massive stationary and movable hinge leaves are preferred as they provide the desired strength in the system, but other forms could of course be used.

Preferably, the hinge leaves and latch systems are provided at intervals of about 18 inches spaced longitudinally along the entire length of the pipe mold. Other spacing could be utilized, but this spacing has been found satisfactory.

The foregoing disclosure and description of the invention are illustrative and explanatory thereof and various changes in the size, shape and materials, as well as in the details of the illustrated construction, may be made within the scope of the appended claims without departing from the spirit of the invention.

What we claim is:

1. A mold comprising:
   a stationary mold half,
   a movable mold half,
   means for hinging said mold halves together,
   a plurality of latch arms,
   means pivoting each latch arm on the movable mold half,
   cooperable cam means on one end of each arm and the stationary mold half including a cam surface extending substantially perpendicular to a line through the pivot means and the cam means when the cam means is engaged,
   means for rocking each latch arm about its pivot,
   and means engageable with each latch arm limiting rotation of the arm about its pivot when the cam means is disengaged whereby continued movement of the arms thereafter will rotate the movable mold half about its hinge.

2. A mold comprising:
   a stationary mold half,
   a plurality of stationary hinge leaves attached to the stationary mold half,
   a movable mold half,
   a plurality of movable hinge leaves attached to the movable mold half,
   hinge pin means extending through said hinge leaves and providing for movement of the movable mold half about the hinge pin means axis,
   a plurality of latch arms,
   means pivoting each latch arm to a movable hinge leaf,
   cooperable cam means on one end of each arm and a stationary hinge leaf including a cam surface extending substantially perpendicular to a line through the pivot means and the cam means when the cam means is engaged,
   means for rocking each latch arm about its pivot,
   and means engageable with each latch arm limiting rotation of the arm about its pivot when the cam means is disengaged whereby continued movement of the arms thereafter will rotate the movable mold half about said hinge pin means.

3. The mold of claim 2 wherein the cam surfaces are on the stationary leaves and the cams on the arms are provided by rollers.

4. A mold comprising:
   a tubular mold split longitudinally into two halves,
   a plurality of stationary hinge leaves attached to one mold half and extending perpendicular to the longitudinal centerline of the mold to points on opposite sides of the mold,
   a plurality of movable hinge leaves attached to the other mold half and extending parallel to said stationary hinge leaves,
   hinge pin means extending through the stationary and movable hinge leaves on one side of the mold,
   a plurality of L shaped latch arms,
   means pivoting each latch arm to a movable hinge leaf on the other side of the mold with the ends of the arms on opposite sides of the mold,
   cam means on one end of each arm on said other side of the mold and on the stationary hinge leaves on the other side of the mold,
   said cam means including a surface extending substantially perpendicular to a line through the pivot means and the cam means when the cam means is engaged,
   means connected to the other end of each latch arm on said one side of the mold for rocking each arm about its pivot,
   and means engageable with each latch arm limiting rotation of the arm about its pivot when the cam means is disengaged whereby continued movement of the arms thereafter will rotate the movable hinge leaves and attached mold half about said hinge pin means.

5. A mold comprising:
   a stationary mold half,
   a movable mold half,
   means for hinging said mold halves together,
   a plurality of latch arms,
   means pivoting each latch arm on the movable mold half,
   cooperable cam means on one end of each arm and the stationary mold half, means for rocking each latch arm about its pivot, and means engageable with each latch arm limiting rotation of the arm about its pivot when the cam means is disengaged whereby continued movement of the arms thereafter will rotate the movable mold half about its hinge.

References Cited

UNITED STATES PATENTS

| | | | |
|---|---|---|---|
| 1,575,688 | 3/1926 | Joanides | 18—33 |
| 1,687,340 | 10/1928 | Little | 18—43 |
| 2,224,336 | 12/1940 | Bostwick | 18—17 |
| 2,587,061 | 2/1952 | Nelson | 249—161 |
| 2,721,355 | 10/1955 | Zangl | 18—17 |
| 3,128,505 | 4/1964 | Ludwig | 18—42 |
| 3,195,186 | 7/1965 | Gauban et al. | 18—43 |
| 3,298,656 | 1/1967 | Zastrow. | |
| 3,323,173 | 6/1967 | Poyner | 18—43 X |

J. HOWARD FLINT, JR., *Primary Examiner.*

U.S. Cl. X.R.

18—17; 249—170